(12) United States Patent
Ashton et al.

(10) Patent No.: US 9,922,469 B1
(45) Date of Patent: Mar. 20, 2018

(54) ROUTE-BASED VEHICLE SELECTION

(71) Applicant: XL Hybrids, Boston, MA (US)

(72) Inventors: Justin Ashton, Somerville, MA (US); Neal Ennis Brenner, Needham, MA (US)

(73) Assignee: XL Hybrids, Boston, MA (US)

( * ) Notice: Subject to any disclaimer, the term of this patent is extended or adjusted under 35 U.S.C. 154(b) by 192 days.

(21) Appl. No.: 14/074,272

(22) Filed: Nov. 7, 2013

(51) Int. Cl.
G07C 5/08 (2006.01)
B60K 6/00 (2006.01)

(52) U.S. Cl.
CPC .................... G07C 5/08 (2013.01)

(58) Field of Classification Search
None
See application file for complete search history.

(56) References Cited

U.S. PATENT DOCUMENTS

| 1,696,599 A | 12/1928 | Forsberg |
| 1,790,634 A | 1/1931 | Arendt |
| 2,132,450 A | 10/1938 | Wolf |
| 3,493,066 A | 2/1970 | Dooley |
| 3,732,751 A | 5/1973 | Berman et al. |
| 3,874,472 A | 4/1975 | Deane |
| 3,923,115 A | 12/1975 | Helling |
| 4,042,056 A | 8/1977 | Horwinski |
| 4,233,858 A | 11/1980 | Rowlett |
| 4,305,254 A | 12/1981 | Kawakatsu et al. |
| 4,811,804 A | 3/1989 | Ewers et al. |
| 5,125,469 A | 6/1992 | Scott |
| 5,161,638 A | 11/1992 | Hirano |
| 5,267,623 A | 12/1993 | Kashiwagi |
| 5,272,939 A | 12/1993 | Markyvech et al. |
| 5,359,228 A | 10/1994 | Yoshida |
| 5,441,122 A | 8/1995 | Yoshida |
| 5,487,002 A | 1/1996 | Diller et al. |
| 5,490,063 A | 2/1996 | Genise |
| 5,558,588 A | 9/1996 | Schmidt |
| 5,627,752 A | 5/1997 | Buck et al. |
| 5,778,326 A | 7/1998 | Moroto et al. |
| 5,856,709 A | 1/1999 | Ibaraki et al. |
| 5,927,829 A | 7/1999 | Saga et al. |
| 6,176,808 B1 | 1/2001 | Brown et al. |

(Continued)

OTHER PUBLICATIONS

What Is the Best Car to Convert to Electric?, pp. 1-6, posted to internet on May 10, 2012.*

(Continued)

*Primary Examiner* — Navid Ziaeianmehdizadeh
(74) *Attorney, Agent, or Firm* — Fish & Richardson P.C.

(57) ABSTRACT

A system includes a computing device that includes a memory configured to store instructions. The computing device also includes a processor to execute the instructions to perform operations that include receiving data representative of one or more travel parameters for one or more vehicles. The data for each of the one or more travel parameters being represented with distribution ranges. For each of the one or more vehicles, operations include calculating one or more metric values based on the one or more travel parameter data distributions. Operations also include assigning a score to each of the one or more vehicles based on the calculated one or more metric values, and, presenting a ranking of the one or more vehicles based on the assigned scores.

46 Claims, 9 Drawing Sheets

(56) References Cited

U.S. PATENT DOCUMENTS

| | | |
|---|---|---|
| 6,269,290 B1 | 7/2001 | Egami et al. |
| 6,314,347 B1 | 11/2001 | Kuroda et al. |
| 6,328,671 B1 | 12/2001 | Nakajima et al. |
| 6,356,818 B1 | 3/2002 | Wakashiro et al. |
| 6,367,570 B1 | 4/2002 | Long, III et al. |
| 6,520,160 B2 | 2/2003 | Kojima et al. |
| 6,533,692 B1 | 3/2003 | Bowen |
| 6,630,813 B2 | 10/2003 | Berels et al. |
| 6,668,954 B2 | 12/2003 | Field |
| 6,687,581 B2 | 2/2004 | Deguchi et al. |
| 6,826,460 B2 | 11/2004 | Kittell et al. |
| 6,868,927 B2 | 3/2005 | Boll et al. |
| 7,013,205 B1 | 3/2006 | Hafner et al. |
| 7,104,347 B2 | 9/2006 | Severinsky et al. |
| 7,214,156 B2 | 5/2007 | Oliver |
| 7,258,183 B2 | 8/2007 | Leonardi et al. |
| 7,271,555 B1 | 9/2007 | Ciccone |
| 7,367,415 B2 | 5/2008 | Oliver et al. |
| 7,395,887 B2 | 7/2008 | Viergever et al. |
| 7,419,021 B2 | 9/2008 | Morrow et al. |
| 7,434,640 B2 | 10/2008 | Hughes |
| 7,434,641 B2 | 10/2008 | Takami et al. |
| 7,559,578 B2 | 7/2009 | van Leeve et al. |
| 7,610,124 B2 | 10/2009 | Wakashiro et al. |
| 7,647,994 B1 | 1/2010 | Belloso |
| 7,647,997 B2 | 1/2010 | Oliver |
| 7,665,560 B2 | 2/2010 | Gelinas |
| 7,674,994 B1 | 3/2010 | Valerio |
| 7,681,676 B2 | 3/2010 | Kydd |
| 7,849,944 B2 | 12/2010 | DeVault |
| 7,921,950 B2 | 4/2011 | Harris |
| 7,926,387 B2 | 4/2011 | Horiuchi et al. |
| 7,954,579 B2 | 6/2011 | Rodriguez et al. |
| 8,215,442 B2 | 7/2012 | Ishii |
| 8,256,549 B2 | 9/2012 | Crain et al. |
| 8,337,359 B2 | 12/2012 | Hofbauer |
| 8,469,137 B2 | 6/2013 | Fujii |
| 8,596,391 B2 | 12/2013 | Kshatriya |
| 8,630,784 B2 | 1/2014 | Bai |
| 2003/0010563 A1 | 1/2003 | Osuga et al. |
| 2005/0205313 A1 | 9/2005 | Gilmore et al. |
| 2006/0000650 A1 | 1/2006 | Hughey |
| 2006/0030450 A1 | 2/2006 | Kyle |
| 2006/0213703 A1 | 9/2006 | Long |
| 2006/0293841 A1 | 12/2006 | Hrovat et al. |
| 2007/0027593 A1 | 2/2007 | Shah et al. |
| 2007/0129878 A1 | 6/2007 | Pepper |
| 2007/0135988 A1 | 6/2007 | Kidston et al. |
| 2007/0137919 A1 | 6/2007 | Jolley |
| 2007/0163819 A1 | 7/2007 | Richter et al. |
| 2008/0208393 A1 | 8/2008 | Schricker |
| 2008/0213703 A1 | 9/2008 | Shafer et al. |
| 2008/0236910 A1 | 10/2008 | Kejha et al. |
| 2008/0319596 A1 | 12/2008 | Yamada |
| 2009/0015202 A1 | 1/2009 | Miura |
| 2009/0192660 A1 | 7/2009 | Tamor et al. |
| 2009/0198398 A1 | 8/2009 | Yamada |
| 2009/0212626 A1 | 8/2009 | Snyder et al. |
| 2009/0223725 A1 | 9/2009 | Rodriguez et al. |
| 2009/0259355 A1 | 10/2009 | Li |
| 2010/0001672 A1 | 1/2010 | Maeda et al. |
| 2010/0044129 A1 | 2/2010 | Kyle |
| 2010/0106351 A1 | 4/2010 | Hanssen et al. |
| 2010/0219007 A1 | 9/2010 | Dalum et al. |
| 2010/0274426 A1 | 10/2010 | Le Brusq et al. |
| 2011/0024211 A1 | 2/2011 | Kikuchi |
| 2011/0029173 A1 | 2/2011 | Hyde et al. |
| 2011/0029181 A1 | 2/2011 | Hyde et al. |
| 2011/0047102 A1 | 2/2011 | Grider et al. |
| 2011/0071712 A1 | 3/2011 | Mizuno et al. |
| 2011/0098873 A1 | 4/2011 | Koga et al. |
| 2011/0148618 A1 | 6/2011 | Harumoto et al. |
| 2011/0160990 A1 | 6/2011 | Mineta |
| 2011/0270486 A1 | 11/2011 | Stevens et al. |
| 2012/0065834 A1 | 3/2012 | Senart et al. |
| 2012/0072049 A1 | 3/2012 | Haaf et al. |
| 2012/0239462 A1 | 9/2012 | Pursell et al. |
| 2012/0323474 A1 | 12/2012 | Breed et al. |
| 2013/0046526 A1* | 2/2013 | Yucel et al. .................. 703/8 |
| 2013/0060410 A1 | 3/2013 | Crain et al. |

OTHER PUBLICATIONS

Abdi, Herve, Normalizing Data, 2010, Encyclopedia of Research Design, 4 pages.

* cited by examiner

Vehicle A

| Vehicle Speed Range | Fuel Consumed (gal) | Time Spent (h) | Distance Driven (mi) | Fuel Economy (MPG) | Fuel Rate (gal/h) | % Distance |
|---|---|---|---|---|---|---|
| 0 MPH | 9.25 | 15.08 | 0.00 | 0.00 | 0.614 | 0.0% |
| 0 - 10 MPH | 4.62 | 4.21 | 20.69 | 4.48 | 1.097 | 1.9% |
| 10 - 20 MPH | 7.90 | 4.10 | 62.11 | 7.86 | 1.925 | 5.6% |
| 20 - 30 MPH | 14.28 | 7.32 | 188.75 | 13.22 | 1.951 | 17.2% |
| 30 - 40 MPH | 22.53 | 12.04 | 418.67 | 18.59 | 1.872 | 38.1% |
| 40 - 50 MPH | 7.79 | 3.55 | 154.34 | 19.82 | 2.194 | 14.0% |
| 50 - 60 MPH | 5.66 | 1.95 | 108.55 | 19.18 | 2.902 | 9.9% |
| 60 - 70 MPH | 7.28 | 2.06 | 133.24 | 18.31 | 3.526 | 12.1% |
| 70+ MPH | 0.76 | 0.18 | 13.15 | 17.35 | 4.120 | 1.2% |

Vehicle B

| Vehicle Speed Range | Fuel Consumed (gal) | Time Spent (h) | Distance Driven (mi) | Fuel Economy (MPG) | Fuel Rate (gal/h) | % Distance |
|---|---|---|---|---|---|---|
| 0 MPH | 7.96 | 13.84 | 0.00 | 0.00 | 0.575 | 0.0% |
| 0 - 10 MPH | 3.05 | 3.24 | 15.83 | 5.19 | 0.943 | 2.1% |
| 10 - 20 MPH | 4.45 | 3.17 | 48.28 | 10.84 | 1.407 | 6.3% |
| 20 - 30 MPH | 9.57 | 6.40 | 163.95 | 17.12 | 1.496 | 21.4% |
| 30 - 40 MPH | 15.71 | 9.30 | 322.19 | 20.51 | 1.689 | 42.1% |
| 40 - 50 MPH | 4.63 | 2.05 | 89.11 | 19.23 | 2.258 | 11.6% |
| 50 - 60 MPH | 3.45 | 1.16 | 64.49 | 18.68 | 2.979 | 8.4% |
| 60 - 70 MPH | 2.98 | 0.92 | 58.75 | 19.70 | 3.241 | 7.7% |
| 70+ MPH | 0.17 | 0.04 | 3.05 | 18.26 | 3.795 | 0.4% |

FIG. 4

Vehicle Metrics

| Vehicle Ranking | Vehicle Score | Metric Average | % Distance at < 40 MPH | Correlation | Total Distance (1 year) |
|---|---|---|---|---|---|
| 1. Veh. 42 | • 92 | • 214 | • 73% | • 88% | • 15,499 |
| 2. Veh. 99 | • 87 | • 207 | • 68% | • 59% | • 13,850 |
| 3. Veh. 83 | • 84 | • 199 | • 55% | • 51% | • 9,880 |
| 4. Veh. 87 | • 82 | • 182 | • 43% | • 45% | • 30,122 |
| 5. Veh. 03 | • 74 | • 167 | • 41% | • 21% | • 20,611 |
| 6. Veh. 96 | • 68 | • 154 | • 37% | • 17% | • 7,332 |
| 7. Veh. 56 | • 54 | • 122 | • 33% | • 8% | • 26,228 |
| 8. Veh. 07 | • 46 | • 115 | • 28% | • -11% | • 21,892 |

FIG. 6

ROUTE-BASED VEHICLE SELECTION

BACKGROUND

This description relates to techniques for processing data to identify vehicles and types of vehicles for travel routes.

With the increased interest in reducing dependency on fossil fuels, the use of alternative energy sources has been incorporated into various applications, such as transportation. Both public and private transportation vehicles have been developed to run on fuels other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described here relate to computing and presenting rankings of vehicles, vehicle types, etc. based on traveled routes. Metrics computed from distributions of data (e.g., distributed over ranges of vehicle speeds) for one or more travel parameters (e.g., distance traveled, fuel consumed, operating time, etc.) allow scores to be assigned to each vehicle, vehicle type, etc. Once ranked and presented for analysis, vehicle use, operations, etc. may be adjusted to achieve performance improvements (e.g., fuel economy) for the individual vehicles and potentially vehicle fleets (e.g., identify particular combustion engine vehicles for conversion to alternative energy based vehicles).

In one aspect, a computing device-implemented method includes receiving data representative of one or more travel parameters for one or more vehicles. The data for each of the one or more travel parameters being represented with distribution ranges. For each of the one or more vehicles, the method includes calculating one or more metric values based on the one or more travel parameter data distributions. The method also includes assigning a score to each of the one or more vehicles based on the calculated one or more metric values, and, presenting a ranking of the one or more vehicles based on the assigned scores.

Implementations may include one or more of the following features. The data representative of one or more travel parameters for one or more vehicles may be calculated from data collected from the one or more vehicles. The data collected from the one or more vehicles may represent at least one of vehicle position, vehicle speed or time. At least one of the travel parameters may represent distance traveled by the vehicle. One of the metrics may represent a percentage of distance traveled by the vehicle below a particular speed. One of the metrics may be based on correlating one of the travel parameter distributions and distribution data representing a standard. One of the metrics may be based on distance traveled by the vehicle for a period of time. The distribution ranges may represent vehicle speeds, vehicle acceleration, etc. The assigned score may represent vehicle performance for a drive cycle. The presented ranking may represent potential conversion candidate vehicles. The data representative of one or more travel parameters may be received from a data service provider.

In another aspect, a system includes a computing device that includes a memory configured to store instructions. The computing device also includes a processor to execute the instructions to perform operations that include receiving data representative of one or more travel parameters for one or more vehicles. The data for each of the one or more travel parameters being represented with distribution ranges. For each of the one or more vehicles, operations include calculating one or more metric values based on the one or more travel parameter data distributions. Operations also include assigning a score to each of the one or more vehicles based on the calculated one or more metric values, and, presenting a ranking of the one or more vehicles based on the assigned scores.

Implementations may include one or more of the following features. The data representative of one or more travel parameters for one or more vehicles may be calculated from data collected from the one or more vehicles. The data collected from the one or more vehicles may represent at least one of vehicle position, vehicle speed or time. At least one of the travel parameters may represent distance traveled by the vehicle. One of the metrics may represent a percentage of distance traveled by the vehicle below a particular speed. One of the metrics may be based on correlating one of the travel parameter distributions and distribution data representing a standard. One of the metrics may be based on distance traveled by the vehicle for a period of time. The distribution ranges may represent vehicle speeds, vehicle acceleration, etc. The assigned score may represent vehicle performance for a drive cycle. The presented ranking may represent potential conversion candidate vehicles. The data representative of one or more travel parameters may be received from a data service provider.

In another aspect, one or more computer readable media storing instructions that are executable by a processing device, and upon such execution cause the processing device to perform operations that include receiving data representative of one or more travel parameters for one or more vehicles. The data for each of the one or more travel parameters being represented with distribution ranges. For each of the one or more vehicles, operations also include calculating one or more metric values based on the one or more travel parameter data distributions. Operations also include assigning a score to each of the one or more vehicles based on the calculated one or more metric values, and, presenting a ranking of the one or more vehicles based on the assigned scores.

Implementations may include one or more of the following features. The data representative of one or more travel parameters for one or more vehicles may be calculated from data collected from the one or more vehicles. The data collected from the one or more vehicles may represent at least one of vehicle position, vehicle speed or time. At least one of the travel parameters may represent distance traveled by the vehicle. One of the metrics may represent a percentage of distance traveled by the vehicle below a particular speed. One of the metrics may be based on correlating one of the travel parameter distributions and distribution data representing a standard. One of the metrics may be based on distance traveled by the vehicle for a period of time. The distribution ranges may represent vehicle speeds, vehicle acceleration, etc. The assigned score may represent vehicle performance for a drive cycle. The presented ranking may represent potential conversion candidate vehicles. The data representative of one or more travel parameters may be received from a data service provider.

These and other aspects, features and various combinations may be expressed as methods, apparatus, systems, means for performing functions, program products, and in other ways.

Other features and advantages will be apparent from the description and the claims.

DESCRIPTION OF DRAWINGS

FIG. 4 illustrates charts of travel parameters for a combustion engine vehicle and an alternative energy vehicle.

FIG. 6 is a chart of a ranked list of vehicles.

DETAILED DESCRIPTION

Figure 1:
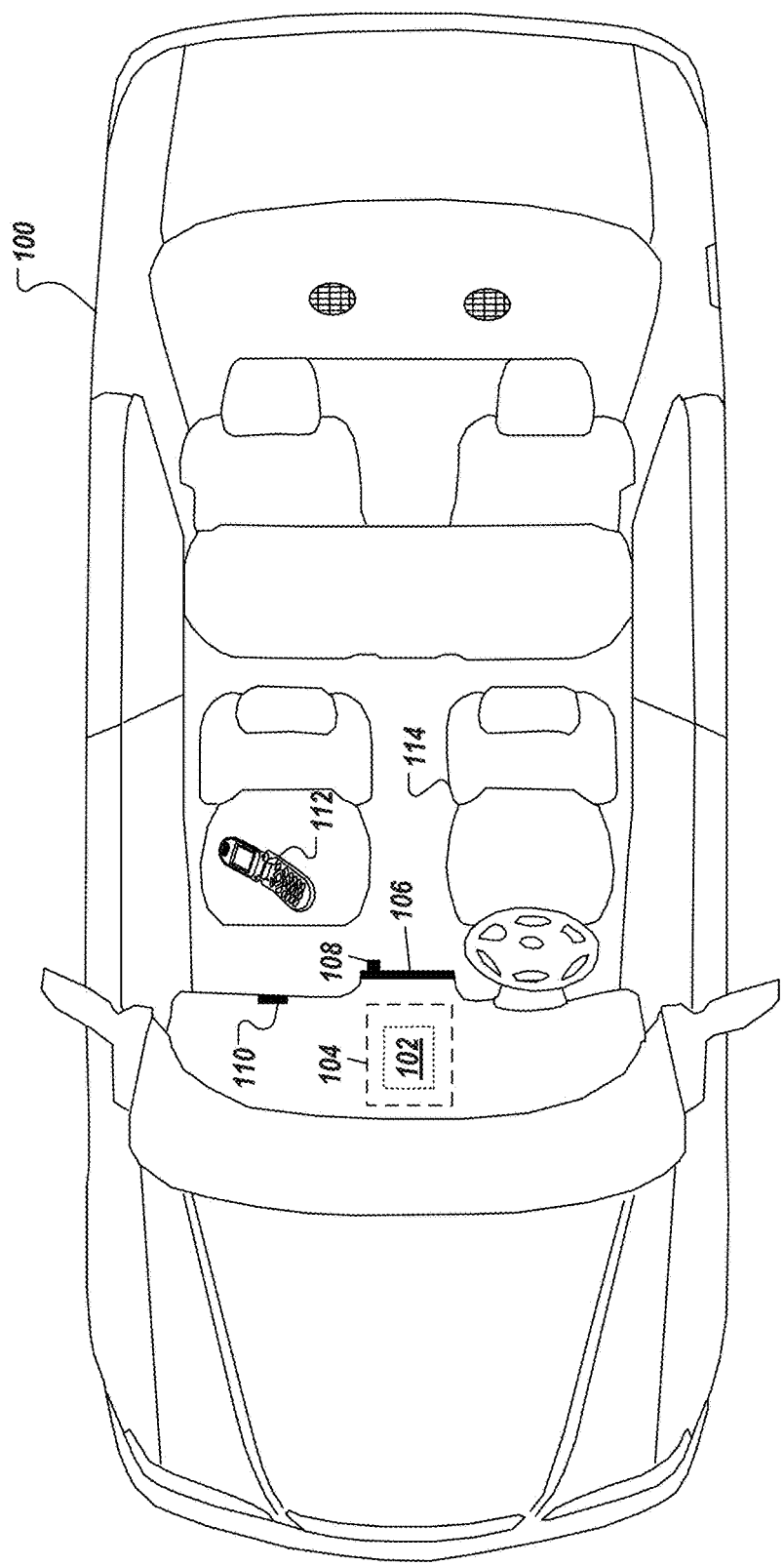
FIG. 1 illustrates a vehicle that includes a vehicle information manager.

Referring to FIG. 1, based upon the traveled routes and environments (e.g., highway, city, rural, etc.) the use of different vehicles, types of vehicles, etc. may prove optimum. Some environments and driving conditions may lend well for conventional internal combustion based vehicles while alternative fuel vehicles, which may solely rely upon non-petroleum energy sources (e.g., electricity, natural gas, biofuels etc.), may be better suited for other environments. Other vehicles that may prove to be optimum include hybrid vehicles that employ two or more distinct power sources (e.g., an electric motor and an internal combustion engine—referred to as a hybrid electric vehicle or HEV). Some hybrid vehicles (referred to as plug-in hybrid vehicles) may operate by using energy storage devices that can be replenished (e.g., rechargeable batteries). In some arrangements, for electrical energy storage devices, one or more techniques may be implemented for charging and recharging the devices. For example, batteries may be charged through regenerative braking, strategic charging techniques, etc. during appropriate operating periods of the vehicle. In general, energy is typically lost as heat in conventional braking systems, however a regenerative braking system may recover this energy by using an electric generator to assist braking operations. Some systems and techniques may also strategically collect (e.g., leech) energy from the combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine. One or more control strategies may be used to determine these time periods. Similarly, periods of time may also be determined to engage regenerative braking and strategic charging in order to replenish energy storage. Other operations of the vehicle (e.g., accelerate, decelerate, gear changes, etc.) may also be defined for the control strategies. By developing such strategies to control the assistance provided to combustion engines (e.g., during low efficiency periods), energy may be conserved without negatively impacting vehicle performance. Along with such strategies, individual vehicles, types of vehicles, etc. may be selected for use based on the operational environment, travel route, etc.

Some vehicle manufacturers may recommend operations and control strategies for entire classes of vehicles or other types of large vehicle groups (e.g., based on same vehicle model, vehicle line, etc.) at particular times (e.g., at the release of the vehicle line). Similarly, the level of assistance provided by an electric motor or other type of alternative fuel system may be a constant. Being rather static, such recommendations do not account for the environment in which the vehicle is operated. Route specific information (e.g., vehicle is driven under highway, city, rural, etc. conditions), driver information (e.g., driver accelerating and braking tendencies, etc.) and other types of environmental information (e.g., time of day, season, etc.) are not accounted for in determining the appropriate operational strategies. Furthermore, vehicle selection is typically determined without consulting such route and environmental information. Typically a vehicle is selected absent this information because there is no other option (e.g., the driver has access to a single vehicle) or no information is provided for vehicle management (e.g., a vehicle is randomly assigned to a driver, such as a delivery truck). Absent taking steps to attain, analyze and use such information for vehicle selection, poor performance may occur along with related negative impacts (e.g., reduced fuel efficiency, increased operating costs, etc.). One or more techniques may be implemented for appropriately selecting a vehicle, type of vehicle, etc. for operating in a particular environment. For example, data reflective of vehicles operating in the environment may be used for selecting a vehicle, which type of vehicle, etc. For such determinations, one or more techniques may be implemented. For example, data such as operating speeds, fuel economy, etc. may be used for calculating one or more performance metrics. In turn, the metrics may be utilized to determine a numerical score for the vehicle. Once assigned, the score can be used to rank the vehicle for being operated in that environment and for performing further analysis. For example, the score or rank may be used to identify which vehicle is appropriate for the environment. Further, the appropriate type of vehicle may be selected. For example, converting one vehicle type (e.g., a combustion engine based vehicle) into another vehicle type (e.g., hybrid vehicle) may provide performance improvements in fuel efficiency, costs, etc. Such improvements may be incorporated into recommended operations and control strategies. For example, hybrid conversions may be more advantageous (e.g., reduced fuel consumption) for lower speed environments and less advantageous in high speed environments.

As shown in FIG. 1, an example vehicle 100 (e.g., a hybrid automobile) is capable of collecting data for use in identifying the appropriate vehicle, type of vehicle, etc. for operating in a particular environment, travel route, etc. To provide this capability, the vehicle includes an information manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the information manager 102 may operate in a generally autonomous manner for data collection, transmission and other types of functionality. To collect vehicle performance related information, data may be collected from one or more inputs. For example, the information manager 102 may communicate with one or more portions of the vehicle. A variety of sensors, components, processing units, etc. of the vehicle may exchange data with the information manager 102. For example, operational information of the vehicle such as speed, acceleration, etc., may be collected over time (e.g., as the vehicle operates) and provided to the informational manager 102. Location information (e.g., from a global positioning system receiver present in the vehicle) may also be collected by the information manager 102 to provide a record of the ground covered during vehicle operation. One or more timing signals can be collected, generated, etc. by the information manager 102. For example, a timing signal may be produced that represents the instances in which the vehicle's speed, location, etc. was sampled (e.g., every two seconds, etc.). Other type of operational information may also be provided from the vehicle; for example, data representing braking, steering, etc. may also be provided to the information manager 102. Vehicle components that provide information to the information manager 102 may also include interface modules, circuitry, etc. for controlling the operations of the combustion engine, the electrical motor, etc.

In some situations, data from sources other than the vehicle may also be collected. For example, user input may be provided. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the information manager 102. To interact with the electronic display 106, a knob 108 illustrates a potential control device; however, one or more other types of devices may be used for user interaction (e.g., a touch screen display, etc.). Similar to using one or more sensors to collect operational data, other types of information may also be gathered; for example, a sensor 110 (here embedded in the dashboard of the vehicle 100) may collect information such as cabin temperature, location of the vehicle (e.g., the sensor being a GPS receiver) and other types of information. By collecting information such as GPS location, additional information may be provided to the information manager 102 (e.g., current location, start location, destination information) which may be used for quantifying vehicle performance. In some arrangements, information from other vehicles may be used by the information manager 102. For example, data may be collected from a fleet of vehicles (e.g., similar or dissimilar to the vehicle 100) and used, for example, for data comparisons. While one sensor 110 is illustrated in this example, multiple sensors may be located internally or externally to the vehicle for information collection (e.g., internal or external temperature, etc.). One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the information manager 102 (e.g., identify driving characteristics of a vehicle operator). Similarly, portions of the vehicle itself (e.g., vehicle components) may collect information for the information manager 102; for example, one or more of the seats of the vehicle 100 (e.g., driver seat 114) may collect information (e.g., position of the seat to estimate the driver's weight) to provide to the information manager 102. Similar to data directly provided by one or more sensors, processed data may also be provided to the information manager 102. For example, gathered information may be processed by one or more computing devices (e.g., processors included in the controller 104) before being provided to the information manager 102.

In general, the collected operational information (vehicle speed, acceleration, etc.) can be used for defining one or more data distributions. For example, the vehicle may operate over a range of speeds, accelerations, etc., based on the operational environment. For highways, remote rural settings, etc. the vehicle may be driven at relatively high speeds for long periods of time. Alternatively, in a busy urban setting, the vehicle may be operated over a larger range of speeds (e.g., slow speeds due to congested traffic) for relatively short periods of time. Data from the vehicle may be associated with these ranges of operating speeds, accelerations, etc. For example, time spent operating within a speed range, distance covered while operating within the speed range, fuel consumed while operating within the speed range, etc. may be collected from the vehicle (or calculated from the collected information) and associated with a speed range. By viewing this data (e.g., time spent, distance driven, fuel consumed, etc.) as a distribution defined by the speed ranges, vehicle performance may be quantified and analyzed for speed ranges. From the analysis, fuel economy and other types of performance measures can be determined. Metrics may also be calculated from the data distributions for applying a score to the vehicle. This score, which reflects the operating environment through the vehicle's distribution data, can be used for vehicle ranking. Along with identifying one or more vehicles whose performance is appropriate for the environment, the ranking may also identify vehicle adjustments to improve performance (e.g., vehicle conversion, type of propulsion system to employ, etc.). One or more control strategies may also be developed from the data distributions and analysis. For example, strategies may be developed from the data distributes for controlling an alternative fuel system of a hybrid vehicle (e.g., an electric motor) in order to assist the combustion engine of the vehicle.

In some arrangements, along with collecting information at the vehicle, remotely located information sources may be accessed by the vehicle. Along with collection remotely located information, some or all of the functionality of the information manager 102 may be provided from a remote location. While residing onboard the vehicle 100 in illustrated figure, the information manager 102 or a portion of the performance manager may, in some arrangements, be located and executed at one or more other locations. In such situations, vehicle equipment (e.g., sensors) may provide (e.g., stream) raw data to a remotely located information manager by employing one or more communication techniques and methodologies. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), wireless technology standards for exchanging data over relatively short distances such as Bluetooth, etc.).

Figure 2:
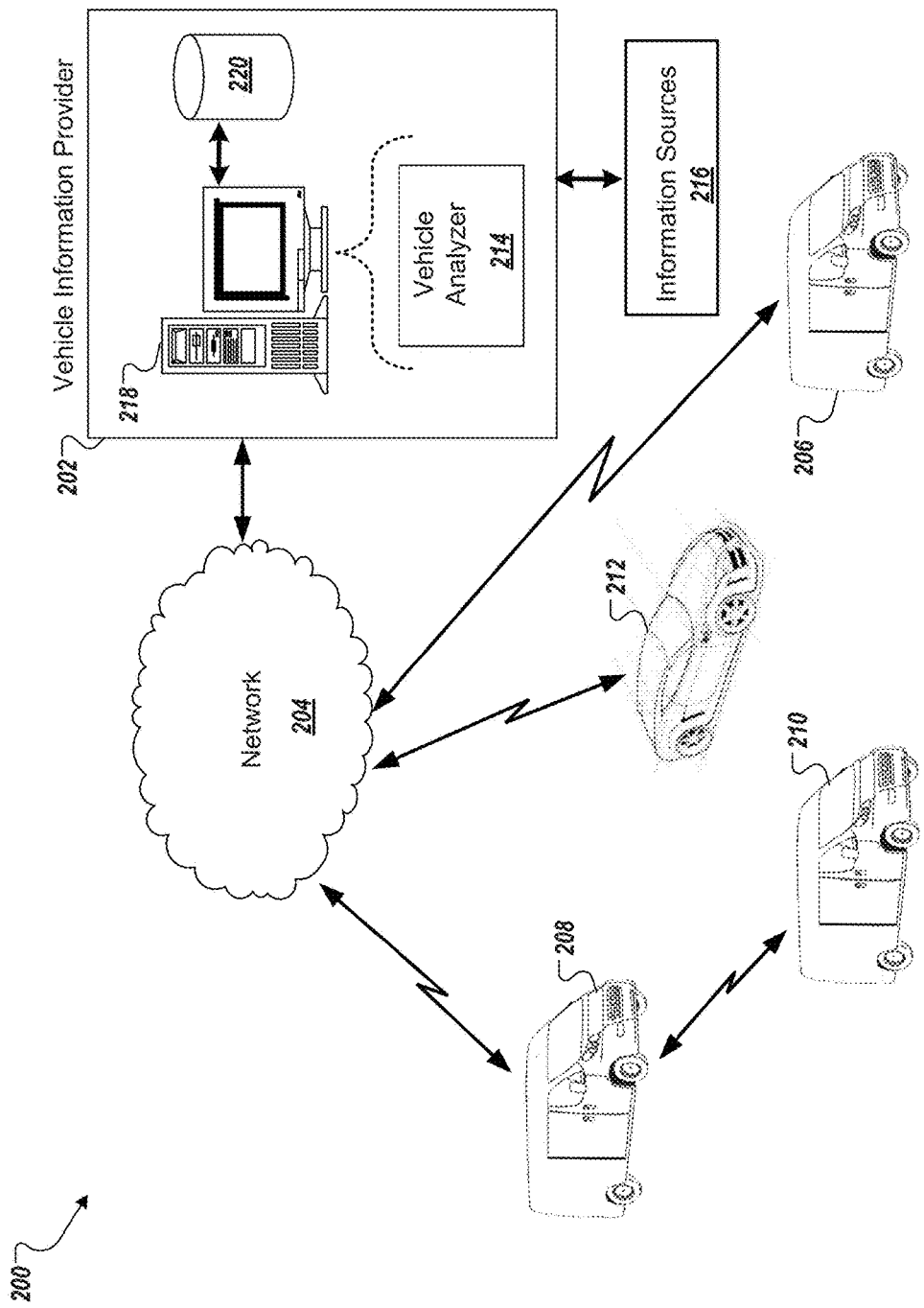
FIG. 2 illustrates a network-based vehicle analyzer for processing data to rank vehicles.

Referring to FIG. 2, an information exchanging environment 200 is presented that allows information to be provided to a central location for storage and analysis (e.g., ranking vehicle for operating in particular environments). In general, the information is collected from individual vehicles or other information sources for the analysis. One or more techniques and methodologies may be implemented; for example, one or more communication techniques and network architectures may be used to exchange information. In the illustrated example a vehicle information provider 202 communicates through a network 204 (e.g., the Internet, an intranet, a combination of networks, etc.) to exchange information with a collection of vehicles (e.g., a small fleet of supply trucks 206, 208, 210, and an automobile 212). Each of the vehicles may employ one type of propulsion system (e.g., a combustion engine, an electric motor, etc.) or a combination of system (e.g., a hybrid vehicle).

In some arrangements, the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information provider 202 and other potential network components (e.g., other vehicles, etc.).

One or more technologies may be used to exchange information among the vehicle information provider 202, the network 204 (or networks) and the collection of vehicles. For example, wireless technology (capable of two-way communication) may be incorporated into the vehicles to exchange information with the vehicle information provider 202. Along with providing and collecting information from the vehicles, the vehicle information provider 202 may be capable of processing information (e.g., in concert with a vehicle analyzer 214 to analyze data and rank vehicles for possible selection, conversion, etc.) and executing related operations (e.g., store collected and processed information).

In some arrangements, the vehicle information provider 202 may operate as a single entity; however, operations may be distributed among various entities to provide the functionality. In some arrangements, some functionality (e.g., operations of the vehicle analyzer 214) may be considered a service, rather than a product, and may be attained by entering into a relationship with the vehicle information provider 202 (e.g., purchase a subscription, enter into a contractual agreement, etc.). As such, the vehicle information provider 202 may be considered as being implemented as a cloud computing architecture in which its functionality is perceived by users (e.g., vehicle operators, business operators, vehicle designers and manufacturers, etc.) as a service rather than a product. For such arrangements, users may be provided information (e.g., vehicle or vehicle type selections for operating in particular environments, vehicle selections for conversion into hybrid vehicles, etc.) from one or more shared resources (e.g., hardware, software, etc.) used by the vehicle information provider 202. For service compensation, one or more techniques may be utilized; for example, subscription plans for various time periods may be implemented (e.g., a time period for monitoring use of vehicles or vehicle types in particular environments, analyzing if new technology should be incorporated into or used to replace vehicles, etc.).

Along with information being provided by one or more vehicles (e.g., received through the network 204, etc.), the vehicle information provider 202 may utilize data from other sources. For example, information sources 216 external to the vehicle information provider 202 may provide vehicle related information (e.g., manufacturer recommendations for performance, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information provider 202; however, other communication techniques may also be implemented (e.g., information from the information sources 216 may be provided through one or more networks such as network 204).

In the illustrated example, to provide such functionality, the vehicle information provider 202 includes a server 218 that is capable of being provided information by the network 204 and the information sources 216. Additionally, the server 218 is illustrated as being in direct communication with a storage device 220 that is located at the vehicle information provider 202 (however, remotely located storage may be accessed by the server 218). In this example, the functionality of the vehicle analyzer 214 is located off-board the vehicle while the functionality of the information manager 102 (shown in FIG. 1) is located on-board the vehicle. In some examples, some functionality of the vehicle analyzer 214 and the information manager 102 may be executed at other locations, distributed across multiple locations, etc. In one arrangement, a portion of the functionality of the vehicle analyzer 214 may be executed on-board a vehicle or a portion of the information manager 102 may executed at the vehicle information provider 202. Provided the information from the one or more of sources, data distributions and metrics may be developed by the vehicle analyzer 214. For example, one or more metrics may be determined that provide a measure of how often the vehicle was able to operate in particle speed ranges. Correlations may also be calculated using data that represents a vehicle's operating performance and one or more performance standards. From the calculated metrics, the vehicle analyzer 214 may score and rank vehicles for comparisons. Along with determining such metrics, rankings, etc., functionality of the vehicle analyzer 214 may appropriately manage collected data, data distributions, rankings, etc. for delivery (e.g., to service subscribers, entities, vehicles, etc.). For example, one or more database systems, data management architectures and communication schemes may be utilized by the vehicle analyzer 214 for information distribution. In some arrangements, such distribution functionality may be provided partially or fully by the vehicle analyzer 214 or external to the vehicle analyzer. In some arrangements this distribution functionality may be provided by other portions of the vehicle information provider 202 or one or more other entities (separate from the information provider) for distributing metrics and/or rankings, etc. Further, while a single server (e.g., server 218) is implemented in this arrangement to provide the functionality for the vehicle information provider 202, additional servers or other types of computing devices may be used to provide the functionality. For example, operations of the vehicle analyzer 214 may be distributed among multiple computing devices in one or more locations.

Upon the metrics, rankings, etc. being produced, one or more operations may be executed to provide appropriate information (e.g., for presentation at one or more entities, vehicles, etc.). By employing one or more data transition techniques, information may be delivered through the network 204 along with other types of communication systems. In some arrangements, one or more trigger events may initiate the information being sent. For example, upon one or more messages, signals, etc. being received at the vehicle information provider 202 (e.g., a request for particular vehicle rankings), data representing the requested information may be provided.

Figure 3:
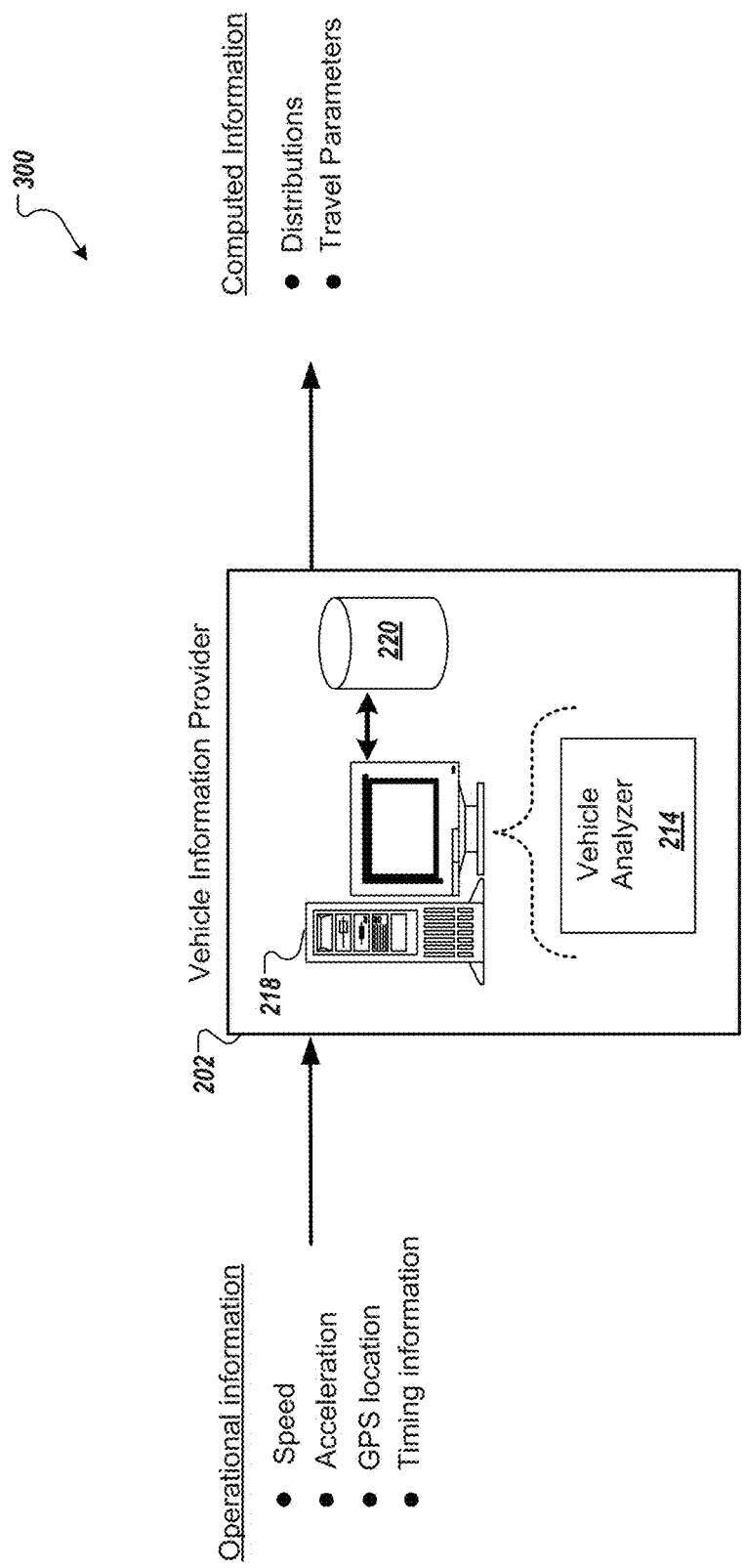
FIG. 3 illustrates the input and output data flow of a vehicle information manager.

Referring to FIG. 3, a graphical representation 300 illustrates data that may be provided to the vehicle analyzer 214 and data correspondingly produced (e.g., for presentation, transmission, etc.). In general, data representing operational information (e.g., speed, acceleration, etc.) from one or more vehicles (e.g., combustion engine based vehicles, alternative energy based vehicles, etc.) is provided to the vehicle analyzer 214. Potentially, other types of information such as environmental-related information (e.g., GPS location of the vehicles, road conditions, etc.) may also be provided. In some arrangements, the information is provided as a time series of data along with timing information (e.g., time stamps) for allowing the vehicle analyzer 214 to perform calculations (e.g., determined distance traveled for each speed, acceleration, etc.). In some arrangements, processed data (e.g., from the information manager 102) may also be provided. For example, operating ranges of the vehicle (e.g., speed ranges, acceleration ranges, etc.) may be provided. In one arrangement, the provided ranges may be operating speeds of the vehicle (e.g., 0 MPH, 0-10 MPH, 10-20 MPH, 20-30 MPH, 30-40 MPH, 40-50 MPH, 50-60 MPH, 60-70 MPH, over 70 MPH). Similar data and ranges may also be provided for acceleration ranges or other types of operational information. In one arrangement, such ranges may be provided from the vehicle (e.g., the information manager 102) to the vehicle information provider 202 for the production of data distributions (e.g., distributions of time spent operating at particular speeds, distance covered while operating at particular accelerations, etc.). Such ranges and distributions may, however, be defined and produced at the vehicle information provider 202 from vehicle provided data (e.g., time series data representing vehicle speed, GPS position, data collection timing, etc.). Along with being provided such data from vehicles under operation (e.g., data transmitted, streamed in real-time, etc.), such data may be provided from other sources. For example, vehicle data (e.g., time series data) may be stored (in one or more storage devices), later retrieved and provided to the vehicle information provider 202.

Once identified, the ranges (e.g., speed ranges, acceleration ranges, etc.) can be used to produce distributions for different travel parameters associated with the operating state of the vehicle. Travel parameters may be calculated from the received operational information and represented in distributions based upon the ranges. For example, the amount of time that the vehicle operates in each range (e.g., time spent traveling between 10 and 20 MPH), distance traveled for each range (e.g., distance covered while traveling between 20 and 40 MPH), fuel consumed while operating within each range (e.g., gallons of fuel consumed while operating between 60 and 70 MPH), etc. may be represented by travel parameters. In some arrangements, data is provided from one or more vehicles that represents the travel parameters (e.g., the amount of fuel consumed over time). Travel parameters may also be determined external to the vehicle (e.g., at the vehicle information provider 202) or in concert with the vehicle (e.g., by the information manager 102).

Such travel parameters may represent quantities that are not tied to a specific type of vehicle. For example, the time that a vehicle operates within a particular speed range (e.g., time spent traveling between 10 and 20 MPH) can be considered a travel parameter that holds for practically all types of vehicles (e.g., combustion engine vehicles, electric motor vehicles, hybrid vehicles, etc.). Other types of travel parameters may represent quantities related to particular types of vehicles; for example, a travel parameter may represent the amount of alternative energy (from an electric motor) applied to a driveline for a particular speed range or may represent the amount of alternative energy regenerated (e.g., electric energy for battery recharging) while the vehicle is operating in a particular speed range. In some arrangements, distribution data (e.g., for a travel parameter over a range of speeds) may be produced on-board the vehicle (e.g., by the information manager 102) and provided to the vehicle analyzer 214. In other arrangements, one or more of the distributions may be produced by the vehicle analyzer 214. For example, provided time series data that represents the operating speeds, accelerations, etc. of a vehicle, the vehicle analyzer 214 may determine a number of appropriate ranges along with the distribution of the times that the vehicle operated within each of the ranges.

Once travel parameter distributions are produced (e.g., time spent, distance covered, fuel consumed, etc. for each speed range), one or more operations may be executed by the vehicle analyzer 214. For example, other data distributions, metrics, etc. may be produced that represent the performance of the vehicle. For example, for each distribution range, a performance metric, such as average fuel economy (e.g., represented in miles-per-gallon), average consumed fuel rate (e.g., represented in gallons-per-hour), percentage total distance travelled, etc., may be computed for each vehicle. From these distributions, other types of metrics may be calculated and used to determine scores and ranking for vehicles.

Once calculated, one or more techniques and methodologies may be implemented to present the distributions, performance metrics, etc. For example, graphical representations, such as one or more histograms, may be used to present data distributions. Other types of graphical representations may also be used to assist a viewer in identifying particular performance features of a vehicle (e.g., for visually comparing with similar information from two or more other vehicles). Along with presenting this information (e.g., on a display device connected to the server 218, a vehicle display, a display located remote from the vehicle information provider), the information may also be stored (e.g., on the storage device 220) at the vehicle information provider 202, at one or more remote locations, etc. Upon being provided the information (e.g., by using the network 204), further processing of the metrics, distributions, etc. may also be executed at the vehicle information provider 202 or at multiple locations.

Referring to FIG. 4, two charts 400, 402 are presented that include distribution data collected and processed for two different vehicles. In this arrangement, similar types of data are collected from each vehicle while under operation (e.g., time series data representing travel speed, GPS position, fuel consumed etc.). From the collected data, travel parameters are calculated for the first vehicle, identified as "Vehicle A", and presented in chart 400. In this example, vehicle A is a combustion engine based vehicle and includes an information manager (such as performance manager 102 shown in FIG. 1) for collecting operational information from the vehicle. As represented in the chart 400, the collected operating speeds of the vehicle are used to define multiple speed ranges. In this particular example, nine ranges (e.g., 0 MPH, 0-10 MPH, 10-20 MPH, 20-30 MPH, 30-40 MPH, 50-60 MPG, 60-70 MPH, and +70 MPG) are defined in column 404; however, more or less ranges be used in other arrangements. Along with the operating speeds of the vehicle, the calculated travel parameters (or collected travel parameters in some arrangements) are also represented in the chart. For the ranges of speeds provided, column 406 represents fuel consumed by the vehicle (in gallons), column 408 represents the time (in hours) spent within each of the speed ranges, and column 410 represents the distance driven for each speed range. The chart 400 also includes other calculated travel parameters. For example, column 412 represents the fuel economy in miles-per-gallon (MPG) determined by dividing distance driven by the time spent within the corresponding speed range of the distribution data. Fuel rate (measured in gallons per hour) is provided by column 414 and is calculated by dividing the fuel consumed by the time spent in the corresponding speed range. The percentage of distance traveled by the vehicle is provided by dividing the distance driven while within the corresponding speed range by the sum of distances traveled for all of the speed ranges (e.g., the sum of the distance values included in column 410). From these travel parameters in columns 406-416, which may be collected, calculated, etc., performance information of the combustion engine based vehicle is determined and presented. Once determined, the scores may be assigned to rank the vehicle, for example, with other vehicles that have traveled in a similar environment (e.g., driven in a similar area, route, etc. under similar conditions).

Chart 402 provides similar distribution data for a vehicle that employs an alternative fuel system, such as a hybrid vehicle, and is identified as "Vehicle B". In some instances, the Vehicle A may also be a hybrid vehicle (e.g., Vehicle B) in which the alternative fuel system (e.g., electric motor) has been deactivated and Vehicle B represents when the alternative fuel system is active. In particular, the chart 402 includes equivalent speed ranges in column 418 and travel parameters determined from operational information collected from the vehicle (e.g., time series data representing travel speed, GPS position, fuel consumed etc.). From the collected data, similar travel parameters are calculated and presented in column 420 (fuel consumed in gallons), column 422 (time spent in hours) and column 424 (distance driven in miles). Also similar to chart 400, chart 402 includes calculated travel parameters in column 426, which provides the fuel economy (in MPG) for each of the speed ranges of the distribution, column 428, which provides the calculated fuel rate (in gallons per hour) for each range, and column 430, which provides the calculated percentage distance traveled within each of the speed ranges. Similar to the distribution data presented in chart 400, the data presented in chart 402 may be used to develop one or more metrics for scoring and ranking the Vehicle B. By using data collected by both vehicles that were operated in similar environment (e.g., driven in the same area, across the same routes, etc.) and both under similar conditions (e.g., driven the same time of day, season of the year, similar weather conditions, etc.), the ranking of the vehicles may suggest which of the two (or another type of vehicle) is better suited for the area, performs better (e.g., conserves fuel while not degrading operations), etc. From the analysis provided by the vehicle analyzer 214, the ranking may represent if another type of fleet vehicle (e.g., a hybrid vehicle) may outperform the current type fleet vehicle operating in the general area or on particular routes.

Figure 5:
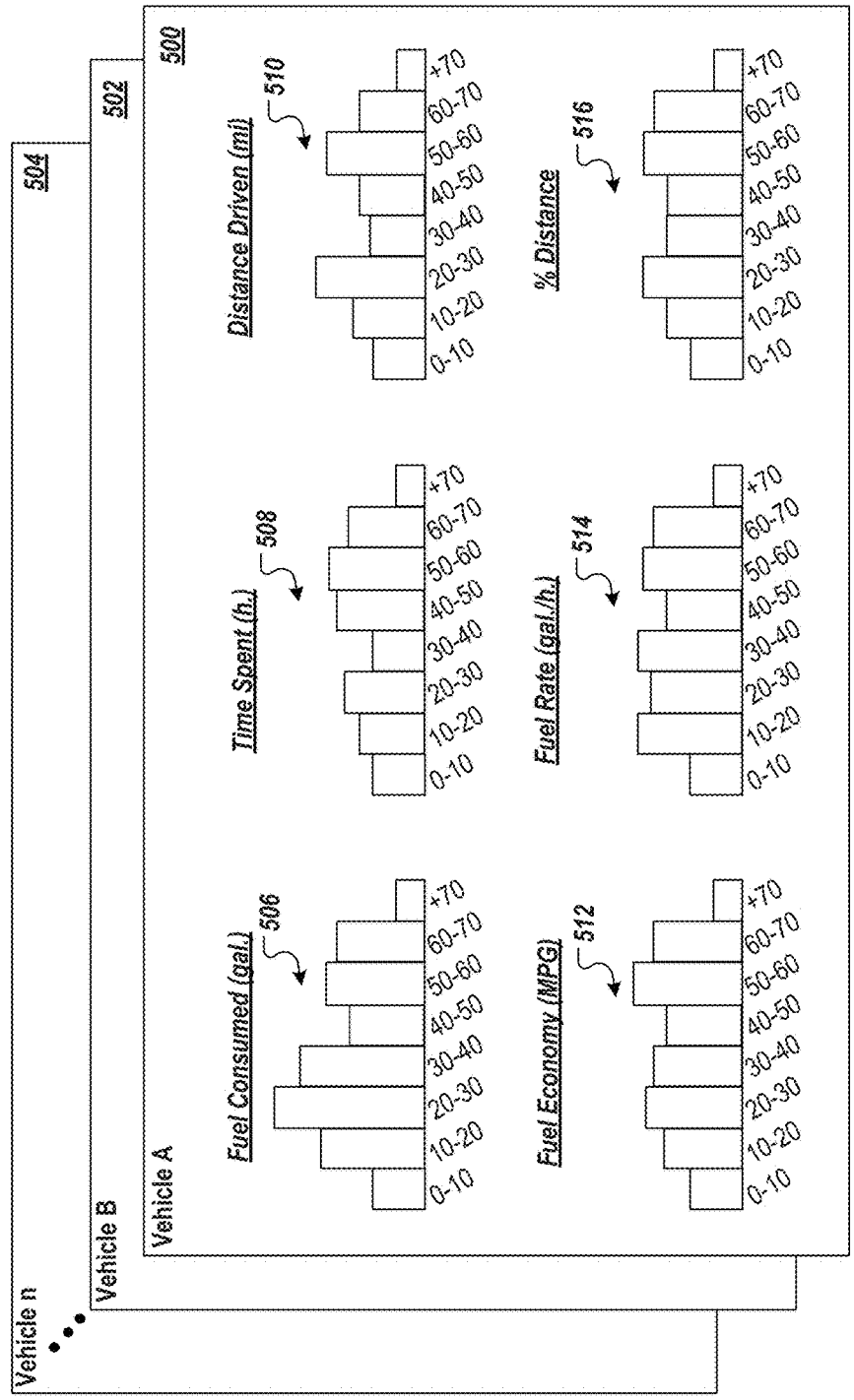
FIG. 5 illustrates histograms of travel parameters for a collection of vehicles.

Referring to FIG. 5, distribution data produced by the vehicle analyzer 214 (shown in FIG. 3) is presented for a collection of vehicles. In this illustration, one sheet presents distribution data that corresponds to one of the vehicles (e.g., sheet 500 presents distribution data for Vehicle A, sheet 502 presents distribution data for Vehicle B and sheet 504 presents distribution data for Vehicle 504). On each sheet, histograms represent data distributions for each produced travel parameter. For example, histograms 506, 508, 510, 512, 514, and 516 correspondingly represent travel parameter distributions for Vehicle A: fuel consumed (in gallons), time spent (in hours), distance driven (in miles), fuel economy (in MPG), fuel rate (in gallons per hour) and percentage of total distance traveled. In this example, equivalent speed ranges are used to represent each histogram, however, in some arrangements the ranges may be match for each of the travel parameter distributions. From the data provided by the distributions, one or more metric may be developed that can be used for comparing the performance of different vehicles, different types of vehicles, etc. The metrics may use information provided by one or more of the histograms 506-516 and may also employ information from other sources.

One exemplary metric may represent the percentage of total distance traveled by each vehicle below a particular speed (e.g., below 40 mph). Such a metric may represent a measure of lower speed travel in which certain types of vehicles (e.g., electric vehicles, hybrid vehicles utilizing their electric motor, etc.) may be considered more efficient. One or more operations may be executed by the vehicle analyzer 214 to attain such a metric; for example, appropriate data may be aggregated from the histogram 516 to determine the percentage distance traveled below a speed (e.g., sum distribution data for ranges 0-10, 10-20, and 20-30 mph).

One or more other metrics may also be developed related to distance traveled. For example, the total distance driven for a period of time (e.g., a week, month, six-month period, year, etc.) may be calculated. From some time periods, data from only a single distribution (e.g., represented in histogram 510) may be needed. For example, if a distribution represents distance data collected for a three-month period, the distribution may be used for determining the total distance traveled by the vehicle for a week or a month. For situations in which a considerable amount of information is needed (e.g., total distance traveled for a year, a five-year period, etc.) data from multiple distributions, histograms, etc. may be utilized. Similar to travel distance, other types of distribution data may be used for developing one or more metrics.

Metrics may also be defined by using information from other sources along with distribution data. For example, one or more standards, models, etc. may be used to compare the vehicle generated data with simulated data that represents drive cycles typically experienced by an operated vehicle. For example, data may be used that represents city driving conditions for a light duty vehicle (and is referred to as the Urban Dynamometer Driving Schedule—UDDS). The UDDS drive cycle data may be represented by a velocity time series (e.g., velocity as a function of time). The data represents a traveled distance of 7.5 miles and an average speed of 19.6 mph. One or more techniques may be employed for developing a performance metric using these data sets. For example, one or more data distributions could be produced from the UDDS data and compared to similar data distributions of the vehicle. Similar to the data distribution represented in the histogram 510, a distribution may be computed (e.g., by the vehicle analyzer 214) that represents distance driven as reflected in the UDDS drive cycle data. As also presented in the histogram 510, matching speed ranges (e.g., 0-10, 10-20, . . . 60-70, +70 mph) could be used for producing the distribution data for the UDDS drive cycle. Similar to producing distribution data that represented driven distance, other types of data distributions may also be computed from the UDDS drive cycle data (e.g., time spent distribution similar to the data in histogram 508, percentage of total distance traveled distribution similar to the data in histogram 516, etc.). Once the UDDS distribution is produced for distance driven, one or more techniques may be implemented to compare the distribution data sets of the vehicle and the UDDS drive cycle. For example, a correlation function may be computed in which both distribution data sets are used as input. Based on the computed correlation of the distributions, one or more recommendations may be reflected in the comparison. For example, since the UDDS drive cycle data reflects city driving conditions, a relatively high correlation between the data sets may suggest that the vehicle has been traveling in a city environment. Further, if the vehicle is a convention combustion engine vehicle, a high correlation may suggest converting to a hybrid vehicle to improve fuel economy for a low-speed driving environment. Other distribution comparison techniques and computations with other types of distribution data may also be utilized to assist with recommending an appropriate vehicle, vehicle type for fleet, etc. for the driving environment. Other standards may also be reflected in distribution data. For example, standard drive cycle test data (e.g., from Federal Test Procedure (FTP)) such as highway driving (HWFET), aggressive driving (SFTP US06), optional air conditioning test data (SFTP SC030) may be utilized from one or more groups (e.g., US Environmental Protection Agency (EPA), etc.).

Referring to FIG. 6, a chart 600 presents calculated information in the form of three performance metrics for eight different vehicles. Based upon the calculated metrics, the vehicles are scored and ranked to allow for determining which are appropriate candidates for converting to include alternative fuel system for operating in this environment (e.g., convert a combustion engine based vehicle into a hybrid vehicle). In this particular example, three columns 602, 604, 606 in the chart 600 provide three performance metrics calculated from corresponding vehicle distribution data. For example, column 602 provides the percentage of distance traveled by each vehicle while operating less than 40 mph. As represented in the column 602, numerical values may range from significant amounts (e.g., 73% of distance traveled) to relatively small percentages (e.g., 28% of the traveled distance). Column 604 presents numerical values that represent the level of correlation between the distance traveled distribution data and the distribution data of a UDDS drive cycle. In general, a vehicle having a drive cycle that is highly correlated to the UDDS drive may be a probable candidate for conversion (to a hybrid vehicle). However, if another standardized drive cycle is employed that closely reflects highway travel, high correlation levels may suggest that the vehicle is generally operating efficiently and may not warrant a conversion (from a combustion engine based system to a hybrid system). For the third performance metric in this example, the total distance traveled by each vehicle for a particular time period (e.g., 1 year) is represented in column 606. While three metrics are utilized in this example, more or less metrics may be employed. Furthermore, different types of vehicle performance metrics may be used.

Upon the performance metrics being quantified, one or more types of techniques may be used for scoring and eventually ranking the vehicles (e.g., to identify potential conversion targets). For example, one or more of the performance metrics may be weighted to prioritize the metrics. In one instance, the percentage of distance traveled under 40 mph values (e.g., in column 602) may be weighted heavier than the total distance travelled values (e.g., represented in column 606). Once weighted (if weighting is employed), the metric values may be processed (e.g., averaged) to attain a metric average for each vehicle (as represented in column 608). From these average metric values, a score may be applied to each vehicle (as represented in column 610). In this illustrated example, the scores in column 610 are sorted from largest to smallest for ranking the vehicles. In general, a higher score reflects that the vehicle can be considered a conversion candidate while lower scores reflect that the vehicle can be considered as operating efficiently for the environment (and should not be converted). Upon assigning the scores, the vehicles may be ranked and presented (in a ranked form) using a unique vehicle identifier as illustrated in column 612. Processing may continue, in some arrangements, using the vehicle ranking. For example, one or more thresholds may be defined to indicate which vehicles are recommended for conversion (e.g., a hybrid conversion). For example, as represented by the dashed line 614, vehicles assigned scores larger than 83 can be considered conversion candidates. To highlight such vehicles, the line 614 can be placed at a vertical position below the candidates. Other graphical techniques may be employed to draw attention to this distinction between the vehicles.

Similar to the ranking presented in the chart 600, one or more other bases may be employed. For example, rankings may be determined from other types of performance metrics that may be used separate or in concert with the percentage of distance traveled under 40 mph values (represented in column 602). For example, performance metrics associated with vehicle loading, greenhouse emissions, idling time, etc. may be used for assigning a score and ranking each vehicle. Ranking may be determined for a variety of applications, for example, vehicles may be ranked for various types of drive cycles to allow appropriate vehicles to be matched to the drives cycles. For example, one type of vehicle (e.g., a diesel-engine vehicle) may be highly ranked for one type of drive cycle (e.g., associated with highway travel) while not highly ranked for another type of drive cycle (e.g., local road travel). As such, rankings for a vehicle can be considered multi-dimensional to provide information for a number of drive cycles and other types of scenarios. In some implementations, one or more rules may be applied as part of the scoring and ranking process (e.g., applying a rule before, during or after assigning scores). For example, based upon loading effects, the employed propulsion system, etc. one or more vehicle types may be deemed not appropriate for particular drive cycles. Scoring and/or ranking may be based upon return on investment (ROI) or another type of measure (or multiple measures) that may constrain rankings to include or not include some vehicle types. For example, use of particular vehicle types may be prohibited (e.g., natural gas powered vehicles may be prohibited in some areas). As such, a process of matching appropriate vehicles to one or more drive cycles, environmental conditions, etc. may include application of one or more rules. For example, for some conditions, purchasing a new vehicle may be recommended.

Figure 7:
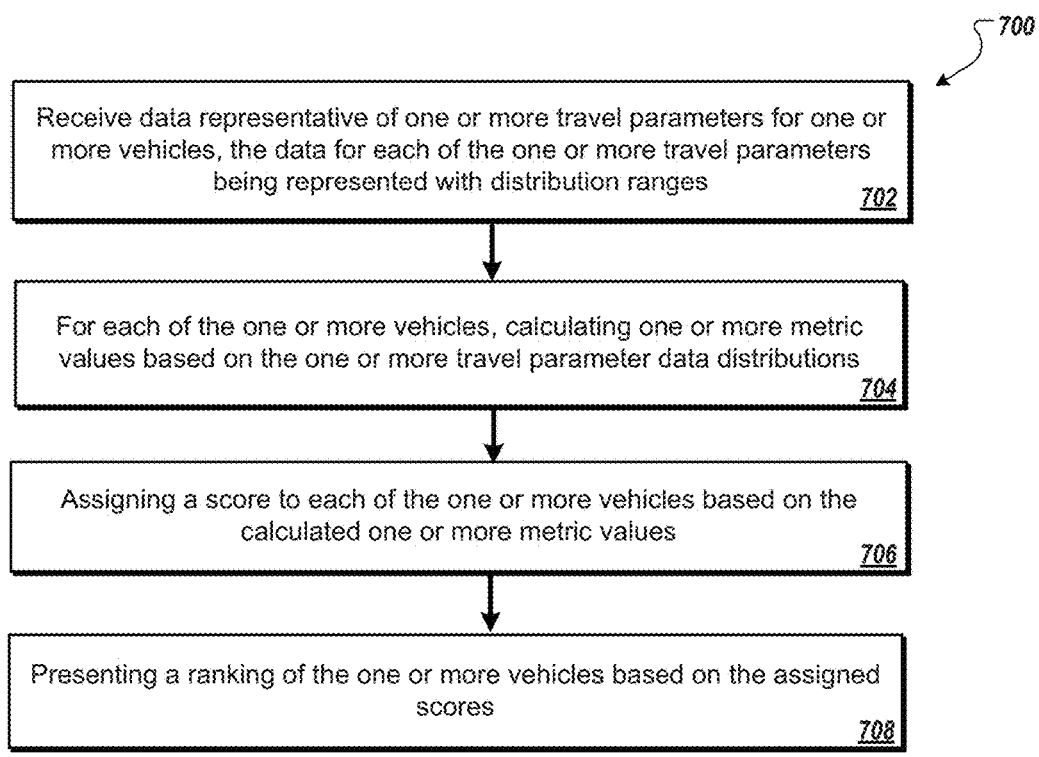
FIG. 7 is a flow chart of representative operations for a vehicle analyzer.

Referring to FIG. 7, a flowchart 700 represents operations of a computing device, such as a server (e.g., the server 218 shown in FIG. 3) executing a vehicle analyzer 214 (also shown in FIG. 3). In general, executed operations use data distributions to determine values for one or more performance metrics (e.g., percentage of distance traveled under 40 mph). The metrics are used to score and rank vehicles and potentially provide recommendations (e.g., assigning vehicles for particular routes, converting vehicle propulsion systems, etc.). Such operations (e.g., of the vehicle analyzer 214) are typically executed by components (e.g., processors, etc.) included in a single computing device (e.g., a computing device such as the server 218 shown in FIG. 3, or an on-board vehicle device such as controller 104 as shown in FIG. 1); however, operations may be executed by multiple computing devices. Along with being executed at a single site (e.g., at the vehicle information manager 202, onboard a vehicle, etc.), operation execution may be distributed among two or more locations.

Operations may include receiving 702 data representative of one or more travel parameters for one or more vehicles. The data for each of the one or more travel parameters is represented with distribution ranges. For example, based upon operational information received from a vehicle (e.g., vehicle speed, acceleration, GPS location of the vehicle, fuel being consumed, a timing signal, etc.) distributions of data may be received by the vehicle analyzer. The data distributions may be defined by ranges that represent bands of operating speeds (e.g., 0-10 mph, 20-30 mph . . . 60-70 mph, over 70 mph, etc.), acceleration bands, etc. The travel parameters represented by the data distributions may represent distance traveled within each range, fuel consumed within each range, time spent operating within each range, etc. (as presented in the charts 400 and 402 in FIG. 4). Operations may also include, for each of the one or more vehicles, calculating 704 one or more metric values based on the one or more travel parameter data distributions. For example, metric values such as the percentage of distance traveled by the vehicle at less than a particular speed (e.g., 40 mph) may be calculated. Such metric values may be calculated by also using other information sources. For example, a data distribution that represents the distance traveled within each range may be correlated to distribution data attained from a standard (e.g., UDDS data). In still another example, a metric value may represent the total distance traveled by the vehicle for a particular time period (e.g., one year). Many other types of metrics may be defined and used to determine corresponding values for vehicles. Operations may also include assigning 706 a score to each of the one or more vehicles based on the calculated one or more metric values. For example, for each vehicle, weights may be applied to each of the calculated metric values and a score may be assigned based upon a combination of the weighted metric values (e.g., a calculated average). Operations may also include presenting 708 a ranking of the one or more vehicles based on the assigned scores. For example, a listing may be presented on the display of a computing device (e.g., at a location where vehicles are assigned delivery routes or selected to perform other types of tasks). The vehicle ranking included in the listing may assist with a number of determinations. Vehicles may be identified from the performance ranking for task assignments. The vehicle performance ranking may also assist with identifying candidate vehicles for particular adjustments. For example, when identified as being inefficient (e.g., poor fuel economy) for city environment travel, a vehicle may be identified for conversion from a combustion engine based vehicle to a hybrid vehicle.

Figure 8:
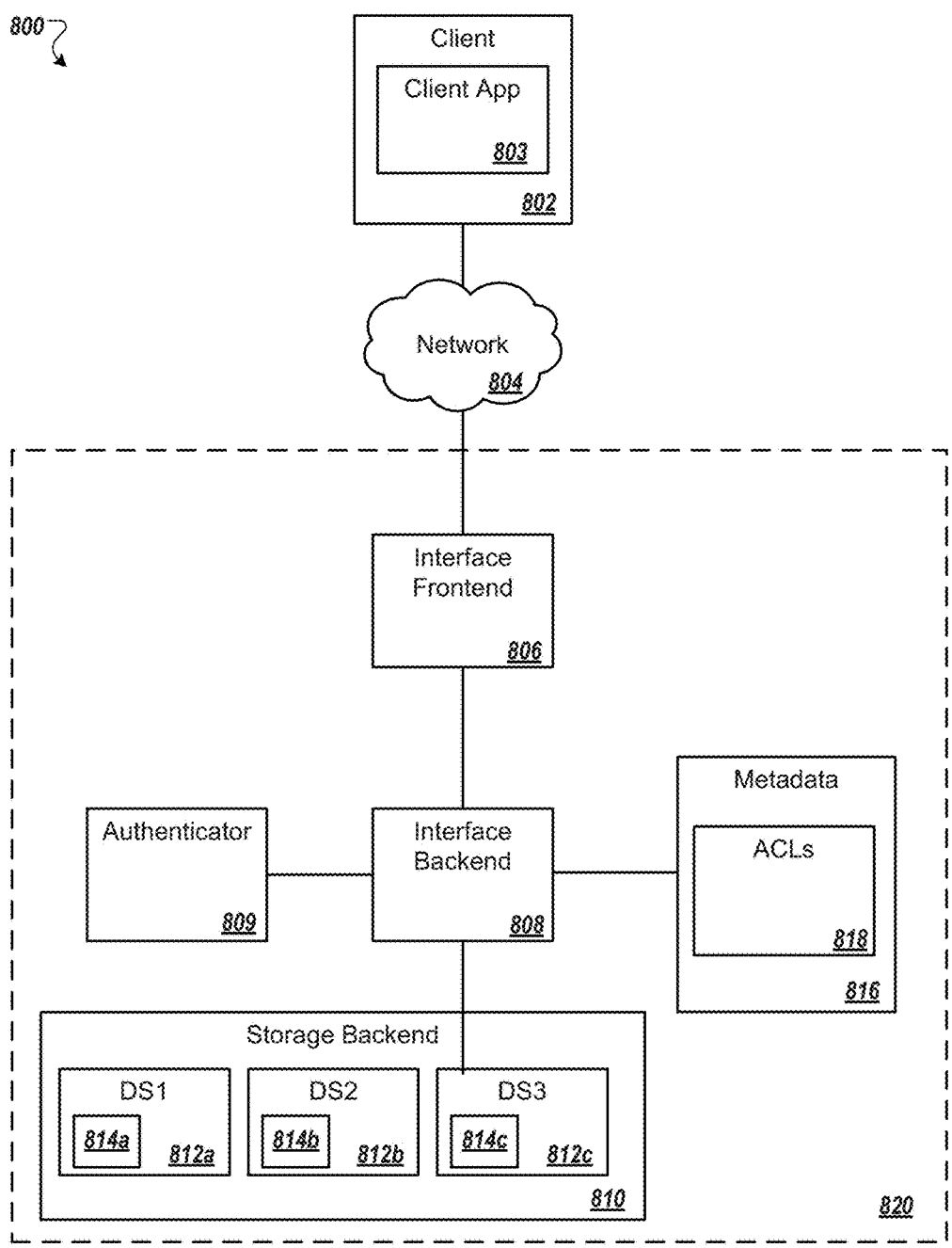
FIG. 8 is a block diagram showing an example of a system for providing hosted storage and accessing the hosted storage from a client device.

FIG. 8 is a block diagram that shows an example of a system 800 for providing hosted storage and accessing the hosted storage from a client device 802 (e.g., a computing device, a computing device incorporated into a vehicle, etc.). In some implementations, a hosted storage service 820 may provide access to stored data (e.g., distribution data, performance metric values, etc.) by applications (e.g., web browsers, dedicated applications) running on computing devices operating separately from one another, provide offsite data backup and restore functionality, provide data storage to a computing device with limited storage capabilities, and/or provide storage functionality not implemented on a computing device.

The system 800 may provide scalable stores for storing data resources. The client device 802 may upload data resources to the hosted storage service 820 and control access to the uploaded data resources. Access control may include a range of sharing levels (e.g., private, shared with one or more individuals, shared with one or more groups, public, etc.). Data stored in hosted storage service 820 can be secured from unauthorized access. The hosted storage service 820 can use a simple and consistent application programming interface, or API, which can allow arbitrary quantities of structured or unstructured data to be kept private or shared between individuals, organizations, and/or with the world at large.

Figure 9:
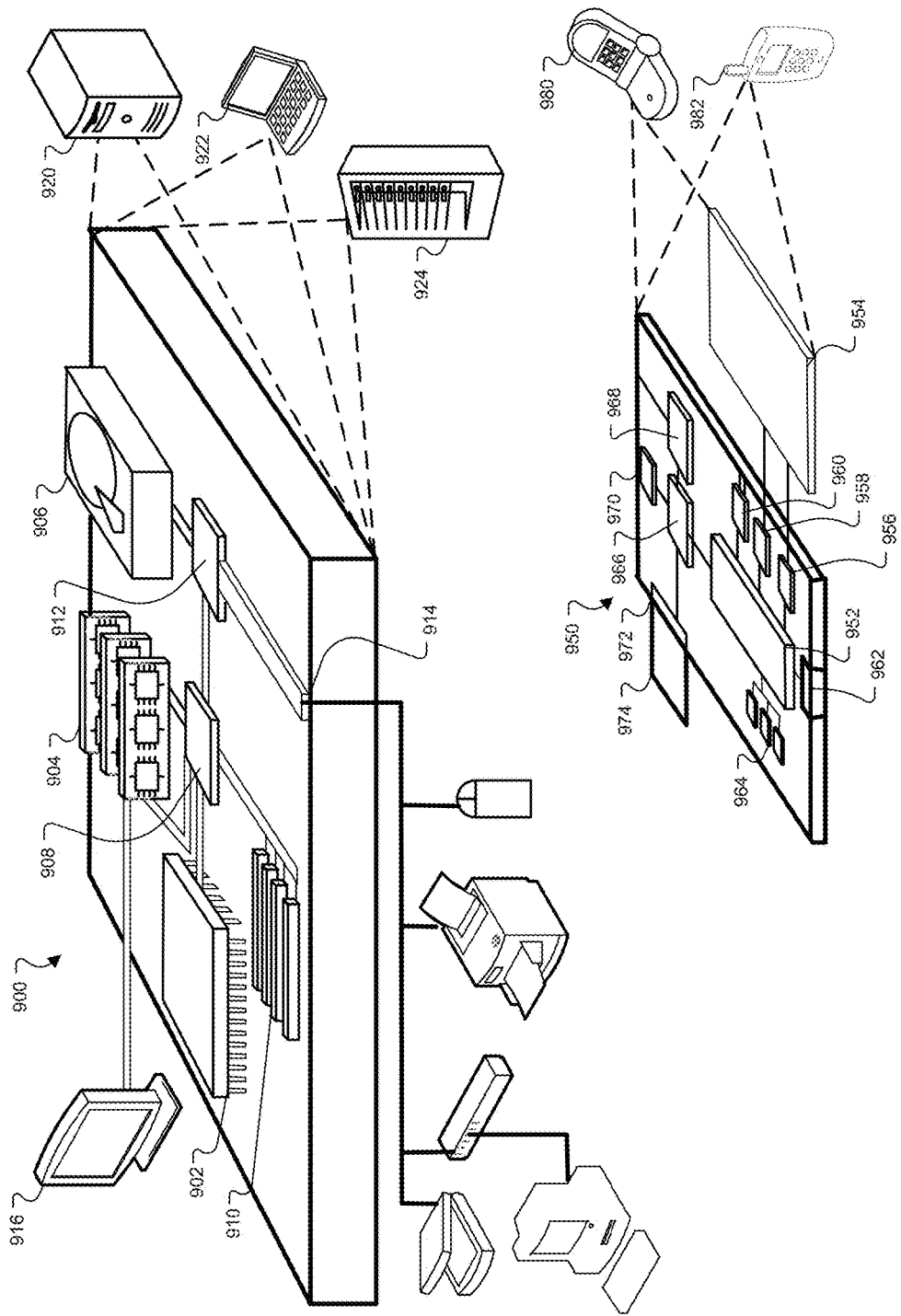
FIG. 9 illustrates an example of a computing device and a mobile computing device that can be used to implement the techniques described here.

The client device 802 may be implemented using a computing device, such as the computing device 900 or the mobile device 950 described with respect to FIG. 9. The client device 802 may communicate with the hosted storage service 820 (e.g., located at the vehicle information provider 202) via a network 804, such as the Internet. The client device 802 may communicate across the network using communication protocols. Electronic mail (e-mail) protocols may also be utilized. For example, one or more e-mail protocols may be used to provide assets (e.g., distributions, metrics, etc.) to an imaging device (e.g., a display) from the hosted storage service 820, a computing device such as the computing device 900 or the mobile device 950, etc. While only a single client device 802 is shown, there may be multiple client devices communicating across the network 804 with the hosted storage service 820 and/or other services and devices.

The hosted storage service 820 may be implemented such that client applications executing on client device 802, such as a client application 803, may store, retrieve, or otherwise manipulate data resources in the hosted storage service 820.

The hosted storage service 820 generally includes an interface frontend 806, an interface backend 808, a storage backend 810, and metadata 816 for resources stored in the storage backend 810. The hosted storage service 820 may also include an authenticator 809 to verify that a user requesting vehicle identification, distribution data, performance metrics, comparison metrics, etc. should be provided access to the data (e.g., based on a service subscription, rental period, etc.).

In general, the interface frontend 806 may receive requests from and send responses to the client device 802. For instance, the hosted storage service 820 may be implemented as a Web Service. Interface frontend 806 may receive messages from the client 802 and parse the requests into a format usable by the hosted storage service 820, such as a remote procedure call (RPC) to an interface backend 808. The interface frontend 806 may write responses generated by the hosted storage service 820 for transmission to the client 802. In some implementations, multiple interface frontends 806 may be implemented (e.g., to support multiple access protocols).

The interface frontend 806 may include a graphical front end, for example, to display on a web browser for data access. The interface frontend 806 may include a sub-system to enable managed uploads and downloads of files (e.g., for functionality such as pause, resume, and recover from time-out).

In some arrangements, a data resource is accessed as a resource, uniquely named using a uniform resource identifier (URI), and the client application 803 and service 820 exchange representations of resource state using a defined set of operations. For example, requested actions may be represented as verbs, such as by HTTP GET, PUT, and DELETE. The GET verb may be used to retrieve a resource. The DELETE verb may be used to delete a resource from the hosted storage service 820. The PUT verb may be used to upload a resource to the service 820. PUT requests may come from the client 802 and contain authentication, authorization credentials, and resource metadata in a header.

In general, resources stored in the hosted storage service 820 may be referenced by resource identifiers. The hosted storage service 820 may define namespaces to which a valid resource identifier must conform. As another example, the namespace may require that resource identifiers be globally unique identifiers (GUIDs).

Resources (e.g., distributions, performance metrics, comparison metrics, etc.) may be stored in hosted storage service 820 in buckets. In some examples, each bucket is uniquely named in the hosted storage service 820, each data resource is uniquely named in a bucket, and every bucket and data resource combination is unique. Data resources may be uniquely identified by a URI that includes the bucket name and the resource name, and identifies the hosted storage service 820. For example, a resource named "/performance_metrics.dat" in a bucket named "metrics" could be specified using a URI pattern such as http://s.hostedstoragesystem.com/metrics/performance_metrics.dat or http://fonts.s.hostedstoragesystem.com/performance_metrics.dat.

The interface backend 808, along with the authenticator 809, may handle request authentication and authorization, manage data and metadata, and track activity, such as for billing. For example, the interface backend 1208 may query the authenticator 809 when a request for one or more fonts is received. The interface backend 808 may also provide additional or alternative functionality. For example, the interface backend 808 may provide functionality for independent frontend/backend scaling for resource utilization and responsiveness under localized heavy loads. Data management may be encapsulated in the interface backend 808 while communication serving may be encapsulated in the interface frontend 806. The interface backend 808 may isolate certain security mechanisms from the client-facing interface frontend 806.

The interface backend 808 may expose an interface usable by both the interface frontend 806 and other systems. In some examples, some features of the interface backend 808 are accessible only by an interface frontend (not shown) used by the owners of the hosted storage service 820 (internal users). Such features may include those needed for administrative tasks (e.g., resolving a resource reference to a low level disk address). The interface backend 808 may handle request authentication (e.g., ensuring a user's credentials are valid) and authorization (e.g., verifying that a requested operation is permitted). The interface backend may also provide encryption and decryption services to prevent unauthorized access to data, even by internal users.

The interface backend 808 may manage metadata 816 associated with data resources. User-specified names can be completely defined within the metadata 816, and resource metadata 816 can map a resource name to one or more datastores 812 storing the resource. The metadata 816 can also contain resource creation times, resource sizes, hashes, and access control lists (ACL) 818 for resources.

The ACLs 818 may generally define who is authorized to perform actions on corresponding resources, and the nature of the permitted actions. The scope may define a user or group of users and the role may define the access permissions for the user or group.

The storage backend 810 may contain multiple datastores 812a-812c. Although three datastores 812 are shown, more or fewer are possible. Each of the datastores 812a-812c may store data resources 814a-814c in a particular format. For example, data store 812a may store a data resource 814a as a binary object, data store 812b may store a data resource 814b in a distributed file system, and data store 812c may store a data resource 814c in a database.

FIG. 9 shows an example computer device 900 and example mobile computer device 950, which can be used to implement the techniques described herein. For example, a portion or all of the operations of an information manager (e.g., the information manger 102 shown in FIG. 1) and/or an analyzer (e.g., the vehicle analyzer 214 shown in FIG. 2) may be executed by the computer device 900 and/or the mobile computer device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906, to display graphical data for a GUI on an external input/output device, including, e.g., display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

Memory 804 stores data within computing device 900. In one implementation, memory 904 is a volatile memory unit or units. In another implementation, memory 904 is a non-volatile memory unit or units. Memory 904 also can be another form of computer-readable medium, including, e.g., a magnetic or optical disk.

Storage device 906 is capable of providing mass storage for computing device 900. In one implementation, storage device 906 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 904, storage device 906, memory on processor 902, and the like.

High-speed controller 908 manages bandwidth-intensive operations for computing device 900, while low speed controller 912 manages lower bandwidth-intensive operations. Such allocation of functions is an example only. In one implementation, high-speed controller 908 is coupled to memory 904, display 916 (e.g., through a graphics processor or accelerator), and to high-speed expansion ports 910, which can accept various expansion cards (not shown). In the implementation, the low-speed controller 912 is coupled to storage device 806 and low-speed expansion port 914. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer (e.g., laptop computer 922). In some examples, components from computing device 900 can be combined with other components in a mobile device (not shown) (e.g., device 950). Each of such devices can contain one or more of computing device 900, 950, and an entire system can be made up of multiple computing devices 900, 950 communicating with each other.

Computing device 950 includes processor 952, memory 964, and an input/output device including, e.g., display 954, communication interface 966, and transceiver 968, among other components. Device 950 also can be provided with a storage device, including, e.g., a microdrive or other device, to provide additional storage. Components 950, 952, 964, 954, 966, and 968, may each be interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for the coordination of the other components of device 950, including, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations. Multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 850 through expansion interface 972, which can include, for example, a SIMM (Single In Line Memory Module) card interface. Such expansion memory 974 can provide extra storage space for device 950, and/or may store applications or other data for device 950. Specifically, expansion memory 974 can also include instructions to carry out or supplement the processes described above and can include secure data. Thus, for example, expansion memory 974 can be provided as a security module for device 950 and can be programmed with instructions that permit secure use of device 950. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 964, expansion memory 974, and/or memory on processor 952, which can be received, for example, over transceiver 968 or external interface 962.

Device 950 can communicate wirelessly through communication interface 966, which can include digital signal processing circuitry where necessary. Communication interface 966 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 968. In addition, short-range communication can occur, including, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950.

Device 950 also can communicate audibly using audio codec 960, which can receive spoken data from a user and convert it to usable digital data. Audio codec 960 can likewise generate audible sound for a user, including, e.g., through a speaker, e.g., in a handset of device 950. Such sound can include sound from voice telephone calls, recorded sound (e.g., voice messages, music files, and the like) and also sound generated by applications operating on device 950.

Computing device 950 can be implemented in a number of different forms, as shown in the figure. For example, it can be implemented as cellular telephone 980. It also can be implemented as part of smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
causing one or more sensors to transmit data representative of one or more travel parameters for one or more vehicles traveling along a route to an information management device configured to wirelessly transmit the data to a remote data server;
cataloging the data at the remote data server, the data comprising a data distribution, into a plurality of distribution ranges for each of the one or more travel parameters, wherein a quantity of the distribution ranges in the plurality of distribution ranges is determined from the data representative of the one or more travel parameters being represented;
calculating one or more performance metric values for each vehicle in a plurality of vehicles including a plurality of vehicle types based on the one or more travel parameters, wherein each performance metric is assigned a weighted value based on the plurality of distribution ranges;
assigning a score to each vehicle in the plurality of vehicles based on the calculated one or more performance metric values;
ranking the vehicles in the plurality of vehicles for traveling along the route based on the assigned scores, a first group of vehicles and a second group of vehicles being identified by applying a threshold to the ranking of the plurality of vehicles;
transmitting a control command generated based on the ranking from the remote data server to the information management device; and
controlling an operation of a propulsion system of a respective one of the one or more vehicles using the control command.

2. The computing device-implemented method of claim 1, wherein the data representative of one or more travel parameters for one or more vehicles is calculated from data collected from the one or more vehicles.

3. The computing device-implemented method of claim 2, wherein the data collected from the one or more vehicles represents at least one of vehicle position, vehicle speed and time and wherein vehicle speed is greater than or equal to zero.

4. The computing device-implemented method of claim 1, wherein at least one of the travel parameters represents distance traveled by the vehicle.

5. The computing device-implemented method of claim 1, wherein one of the performance metrics represents a percentage of distance traveled by the vehicle below a particular speed.

6. The computing device-implemented method of claim 1, wherein one of the performance metrics is based on correlating one of the travel parameter distributions and distribution data representing a standard.

7. The computing device-implemented method of claim 1, wherein one of the performance metrics is based on distance traveled by the vehicle for a period of time.

8. The computing device-implemented method of claim 1, wherein the distribution ranges represent vehicle speeds greater than or equal to zero.

9. The computing device-implemented method of claim 1, wherein the distribution ranges represent vehicle acceleration.

10. The computing device-implemented method of claim 1, wherein the assigned score represents vehicle performance for a drive cycle.

11. The computing device-implemented method of claim 10, wherein vehicle performance represents the fuel efficiency.

12. The computing device-implemented method of claim 10, wherein vehicle performance represents operating cost.

13. The computing device-implemented method of claim 1, wherein the presented ranking represents potential conversion candidate vehicles.

14. The computing device-implemented method of claim 1, wherein the data representative of one or more travel parameters is received from a data service provider.

15. The computing device-implemented method of claim 1, wherein the first group represents vehicles eligible for conversion.

16. The computing device-implemented method of claim 1, wherein at least one of the data distributions is produced onboard the vehicle.

17. The computing device-implemented method of claim 1, wherein the received data includes collection timing information.

18. The computing device-implemented method of claim 1, further comprising:
determining one or more vehicle control strategies from the data distributions.

19. The computing device-implemented method of claim 1, wherein controlling the operation of a propulsion system comprises selecting at least one propulsion system selected from the group consisting of an electric motor and an internal combustion engine for activation.

20. The computing device-implemented method of claim 1, wherein controlling the operation of a propulsion system comprises selecting an energy source for the propulsion system.

21. The computing device-implemented method of claim 1, wherein the control command includes an assignment to operate the respective one of the one or more vehicles along a particular route.

22. The computing device-implemented method of claim 1, wherein the ranking is based on emissions associated with operating each vehicle in the plurality of vehicles along the route.

23. A system comprising:
a computing device comprising:
a memory configured to store instructions; and
a processor to execute the instructions to perform operations comprising:
causing one or more sensors to transmit data representative of one or more travel parameters for one or more vehicles traveling along a route to an information management device configured to wirelessly transmit the data to a remote data server;
cataloging the data at the remote data server, the data comprising a data distribution, into a plurality of distribution ranges for each of the one or more travel parameters, wherein a quantity of the distribution ranges in the plurality of distribution ranges is determined from the data representative of the one or more travel parameters being represented;
calculating one or more performance metric values for each vehicle in a plurality of vehicles including a plurality of vehicle types based on the one or more travel parameters, wherein each performance metric is assigned a weighted value based on the plurality of distribution ranges;
assigning a score to each vehicle in the plurality of vehicles based on the calculated one or more performance metric values;
ranking the vehicles in the plurality of vehicles for traveling along the route based on the assigned scores;
transmitting a control command generated based on the ranking from the remote data server to the information management device; and
controlling an operation of a propulsion system of a respective one of the one or more vehicles using the control command.

24. The system of claim 23, wherein the data representative of one or more travel parameters for one or more vehicles is calculated from data collected from the one or more vehicles.

25. The system of claim 24, wherein the data collected from the one or more vehicles represents at least one of vehicle position, vehicle speed and time and wherein vehicle speed is greater than or equal to zero.

26. The system of claim 23, wherein at least one of the travel parameters represents distance traveled by the vehicle.

27. The system of claim 23, wherein one of the performance metrics represents a percentage of distance traveled by the vehicle below a particular speed.

28. The system of claim 23, wherein one of the performance metrics is based on correlating one of the travel parameter distributions and a distribution data representing a standard.

29. The system of claim 23, wherein one of the performance metrics is based on distance traveled by the vehicle for a period of time.

30. The system of claim 23, wherein the distribution ranges represent vehicle speeds greater than or equal to zero.

31. The system of claim 23, wherein the distribution ranges represent vehicle acceleration.

32. The system of claim 23, wherein the assigned score represents vehicle performance for a drive cycle.

33. The system of claim 23, wherein the presented ranking represents potential conversion candidate vehicles.

34. The system of claim 23, wherein the data representative of one or more travel parameters is received from a data service provider.

35. One or more non-transitory computer readable media storing instructions that are executable by a processing device, and upon such execution cause the processing device to perform operations comprising:
causing one or more sensors to transmit data representative of one or more travel parameters for one or more vehicles traveling along a route to an information management device configured to wirelessly transmit the data to a remote data server;
cataloging the data at the remote data server, the data comprising a data distribution, into a plurality of distribution ranges for each of the one or more travel parameters, wherein a quantity of the distribution ranges is determined by the data representative of the one or more travel parameter being represented;
calculating one or more performance metric values for each vehicle in a plurality of vehicles including a plurality of vehicle types based on the one or more travel parameters, wherein each performance metric is assigned a weighted value based on the plurality of distribution ranges;
assigning a score to each vehicle in the plurality of vehicles based on the calculated one or more performance metric values;
ranking the one or more vehicles based on the assigned scores;
transmitting a control command generated based on the ranking from the remote data server to the information management device; and controlling an operation of a propulsion system of a respective one of the one or more vehicles using the control command.

36. The non-transitory computer readable media of claim 35, wherein the data representative of one or more travel parameters for one or more vehicles is calculated from data collected from the one or more vehicles.

37. The non-transitory computer readable media of claim 36, wherein the data collected from the one or more vehicles represents at least one of vehicle position, vehicle speed and time and wherein vehicle speed is greater than or equal to zero.

38. The non-transitory computer readable media of claim 35, wherein at least one of the travel parameters represents distance traveled by the vehicle.

39. The non-transitory computer readable media of claim 35, wherein one of the performance metrics represents a percentage of distance traveled by the vehicle below a particular speed.

40. The non-transitory computer readable media of claim 35, wherein one of the performance metrics is based on correlating one of the travel parameter distributions and distribution data representing a standard.

41. The non-transitory computer readable media of claim 35, wherein one of the performance metrics is based on distance traveled by the vehicle for a period of time.

42. The non-transitory computer readable media of claim 35, wherein the distribution ranges represent vehicle speeds greater than or equal to zero.

43. The non-transitory computer readable media of claim 35, wherein the distribution ranges represent vehicle acceleration.

44. The non-transitory computer readable media of claim 35, wherein the assigned score represents vehicle performance for a drive cycle.

45. The non-transitory computer readable media of claim 35, wherein the presented ranking represents potential conversion candidate vehicles.

46. The non-transitory computer readable media of claim 35, wherein the data representative of one or more travel parameters is received from a data service provider.

* * * * *